April 30, 1929.  E. S. EVANS  1,711,089
AUTOMOBILE HOLDDOWN
Filed March 17, 1927
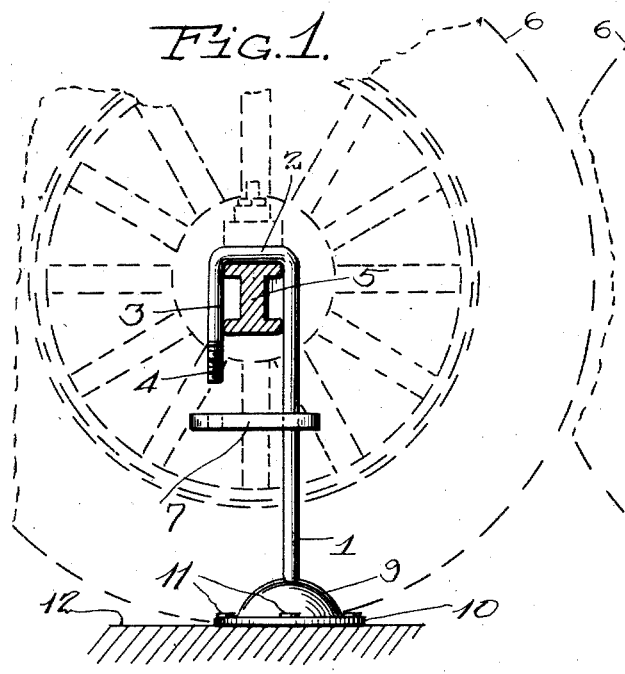
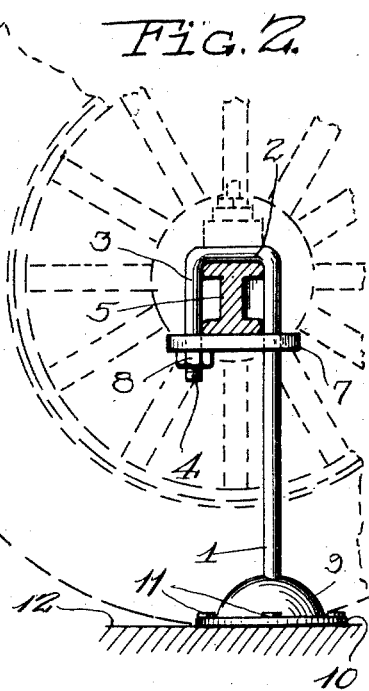
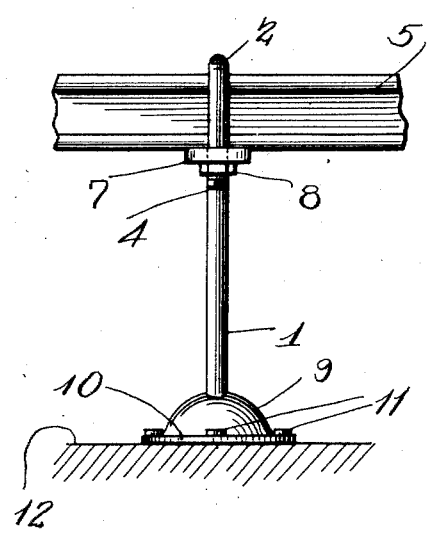
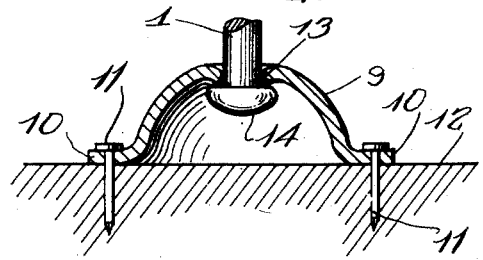
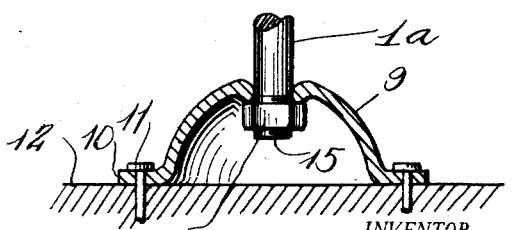
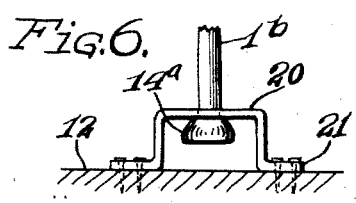
INVENTOR.
Edward S. Evans.
BY
ATTORNEY.

Patented Apr. 30, 1929.

1,711,089

UNITED STATES PATENT OFFICE.

EDWARD S. EVANS, OF DETROIT, MICHIGAN, ASSIGNOR TO THE EVANS AUTO LOADING CO. INC., OF DETROIT, MICHIGAN, A CORPORATION OF DELAWARE.

AUTOMOBILE HOLDDOWN.

Application filed March 17, 1927. Serial No. 176,189.

This invention relates to certain new and useful improvements in automobile holddowns of the type employed in anchoring an automobile or other motor vehicle to the floor of rolling stocks during shipment for holding the same against movement, and the primary object of the invention is to provide a holddown that is non-elastic in a longitudinal direction but having a connection with an anchoring foot possessing universal movement characteristics to facilitate the attachment of the holddown to a car floor and engagement with a part of the vehicle, such as the wheel hub or axle.

A further object of the invention is to provide a holddown of the above type wherein a single bar or rod extends between the engaged part of the vehicle and the anchoring floor foot, the connection between the lower end of the rod and the floor foot being in the nature of a universal joint while a single nut and retainer arm are associated with the upper end of the rod for anchoring the upper end of the rod to the engaged part of the automobile.

With the above and other objects in view that will appear as the nature of the invention is better understood, the same consists in the novel form, combination and arrangements of parts hereinafter more fully described, shown in the accompanying drawing and claimed.

In the accompanying drawing, wherein like reference characters are employed to designate corresponding parts throughout the several views.

Figure 1 fragmentarily illustrates by dotted lines a side elevational view of an automobile wheel with the axle thereof shown in section, the holddown being shown in side elevation anchored to the car floor with the upper end engaged with the vehicle axle and in position to be retained thereon;

Figure 2 is a view similar to Figure 1 showing the upper end of the holddown lockingly engaged with the axle;

Figure 3 is an edge elevational view of the holddown engaged with an axle and anchored to a car floor;

Figure 4 is a vertical longitudinal sectional view through the anchoring foot of the holddown with the lower end of the holddown rod shown in elevation and illustrating the enlarged head at the lower end of the rod;

Figure 5 is a sectional view similar to Figure 4 of another form of construction wherein the lower end of the holddown rod is threaded for the reception of a nut that engages the holddown foot; and Figure 6 is a side elevational view of another form of foot of angle strap formation engaged by the lower headed end of the holddown rod.

The holddown comprises a metallic bar or rod having a vertical leg 1 laterally bent at an angle at 2 to form an arm with the outer end of the arm 2 bent downwardly as at 3 with the terminal end thereof threaded at 4. The upper bent end of the rod 1 is placed in enclosing relations relative to the axle 5 of the wheel 6 and means is associated with the upper bent end of the rod for retaining the same upon the axle 5.

A locking bar 7 having an opening therethrough adjacent each end and has one end slidably positioned upon the vertical rod 1 while the opening in the other end of the bar is aligned with the end portion 3. The bar 7 is moved upwardly so that the threaded end 4 of the portion 3 extends through the opening in the bar as shown in Figure 2 with a retaining nut 8 threaded upon the end of the holddown portion 3 locking the holddown upon the axle 5.

As shown more clearly in Figures 1, 2 and 4, the lower end of the holddown rod 1 is associated with an anchoring foot 9 of shell formation having a marginal flange 10 through which fastening devices 11 pass in entering the car floor 12 or other support. The apex of the shell 9 has an opening 13 therein through which the lower ends of the rod 1 freely extend, and as shown in Figure 4, an enlarged head 14 is formed at the lower end of the rod for securing the anchoring foot to the holddown.

In assembling the parts of the holddown, the anchoring foot 9 is first mounted upon the holddown rod and the bar 7 then placed thereon. The upper bent end of the holddown rod is then placed in enclosing relation with the vehicle axle 5 as shown in Figure 1 and the bar 7 moved upwardly as shown in Figure 2 into engagement with the lower side of the axle and to be so retained by the nut 8. The anchoring foot 9 is then anchored to the supporting floor 12 and in view of the universal connection between the lower end of the rod 1 and the anchoring foot, the usual angularity of the axle and any unevenness of the car floor is compensated for to permit flat engagement of the anchoring foot flange 10 with the car floor.

Another form of connection between the lower end of the rod 1 an anchoring foot is shown in Figure 5, the rod 1ª being threaded at its lower end as at 15 for the reception of the nut 16 that functions in lieu of the integral enlarged head 14 upon the rod 1 as shown in Figure 4. The results obtained are the same except that the anchoring foot 9 may be mounted upon the holddown at the lower end of the rod 1ª.

As shown in Figure 6, the anchoring foot comprises a strap 20 of angle formation having side feet 21 to be secured to the support 12, the intermediate portion of the strap being spaced upwardly from the support 12 and having an opening therein for the passage of the leg of the holddown. It will be observed from an inspection of Figure 4 that the enlarged head 14 upon the rod 1 is substantially flat on its upper face while the lower face is arched downwardly or outwardly curved, while in the form of the invention shown in Figure 6, the lower face of the head 14ª upon the rod 7 is flat and the upper face is convexed or arched.

From the above detailed description of the invention it is believed that the construction and operation thereof will at once be apparent, it being noted that the construction of the holddown is extremely simplified and that a single rigid rod extends from the engaged part of the vehicle to the car floor or other support and as shown in Figures 1 to 4, only a single nut is associated with the holddown device for securing the same in locked engagement with the engaged part of the vehicle, while in the form of the invention shown in Figure 5, a retaining nut is associated with each end of the holddown rod. While the holddown has herein been described as associated with the axle of a vehicle, it is to be understood that the same may be engaged with any other convenient part such as the spring, hub or the like, and while there are herein shown and described the preferred embodiments of the present invention, it is nevertheless to be understood that minor changes may be made therein without departing from the spirit and scope of the invention as claimed.

What I claim as new is:—

In a holddown of the character described, an anchoring foot, a non-elastic member extending between the foot and engaged part of a vehicle and a relatively movable connection between the anchoring foot and non-elastic member, said non-elastic member comprising a rod loosely connected at its lower end to the foot, the upper end of the rod being angularly bent to form an open side loop for inclosing the engaged part of the vehicle, a bar having an opening adjacent each end received on the rod and terminal portion of the bent end to be placed in engagement with the engaged part of the vehicle at the open side of the loop and means for retaining the bar immovable relatively to the engaged part of the vehicle.

In testimony whereof I affix my signature.

EDWARD S. EVANS